United States Patent [19]

Sakaegi et al.

[11] Patent Number: 4,779,032
[45] Date of Patent: Oct. 18, 1988

[54] DRIVE DEVICE

[75] Inventors: Yuji Sakaegi; Nobuo Fukushima, both of Kanagawa, Japan

[73] Assignee: Canon Kabushiki Kaisha, Tokyo, Japan

[21] Appl. No.: 33,024

[22] Filed: Mar. 31, 1987

[30] Foreign Application Priority Data

Mar. 31, 1986 [JP] Japan ................. 61-074019

[51] Int. Cl.⁴ .......................................... G05B 19/40
[52] U.S. Cl. .................... 318/685; 318/696; 360/72.1; 360/78
[58] Field of Search ............... 318/685, 696; 360/72, 360/78; 358/29

[56] References Cited

U.S. PATENT DOCUMENTS 4,146,910 3/1979 Oliver et al.
4,524,381 6/1985 Konishi ............................. 358/29
4,608,613 8/1986 Miyake .............................. 360/78

Primary Examiner—William M. Shoop, Jr.
Assistant Examiner—Saul M. Bergmann
Attorney, Agent, or Firm—Robin, Blecker & Daley

[57] ABSTRACT

A recording apparatus having a recording head for recording video signals on a magnetic disc as the disc rotates, comprises a servo motor, a circuit for generating a feedback signal representing the rotating state of the servo motor, a head moving member for changing over the recording position of the recording head relative to the magnetic disc, and a control circuit for performing a first sequence of controlling the rotating state of the servo motor in response to the feedback signal and a second sequence of controlling the moving state of the head moving member time-dividedly in response to generation of the feedback signal, so that the apparatus is constructed without the necessity of using a standard timing generating source solely used for controlling the movement of the head.

16 Claims, 6 Drawing Sheets

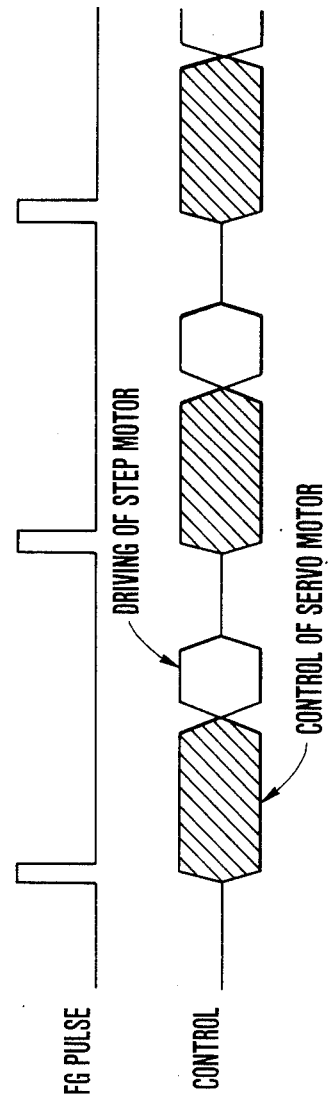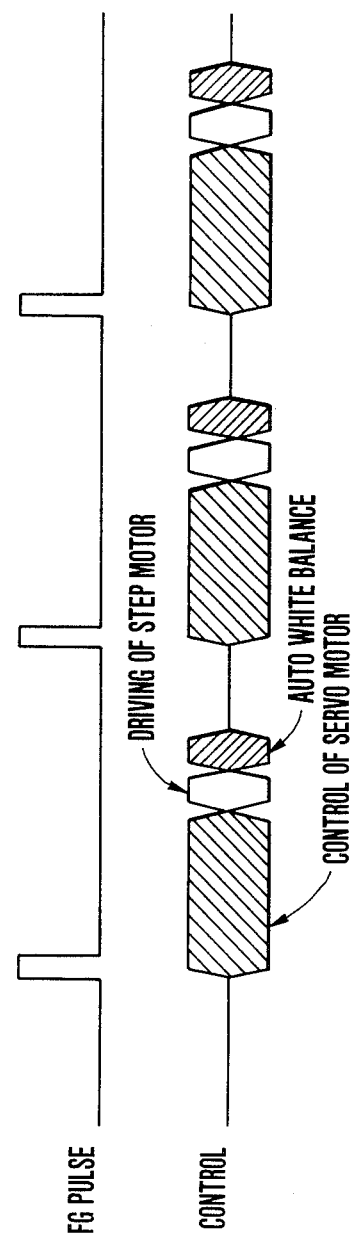

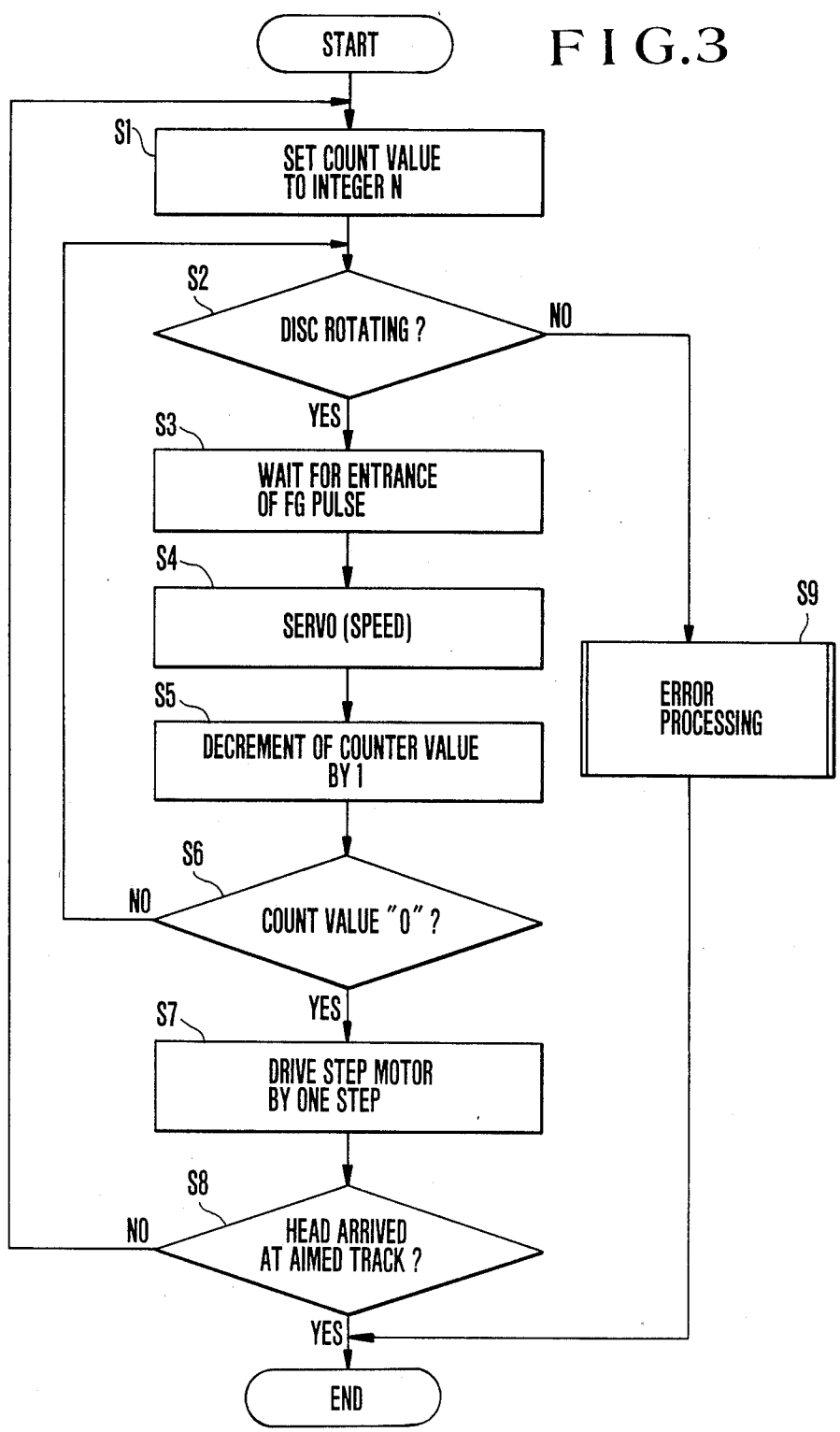

F I G. 7
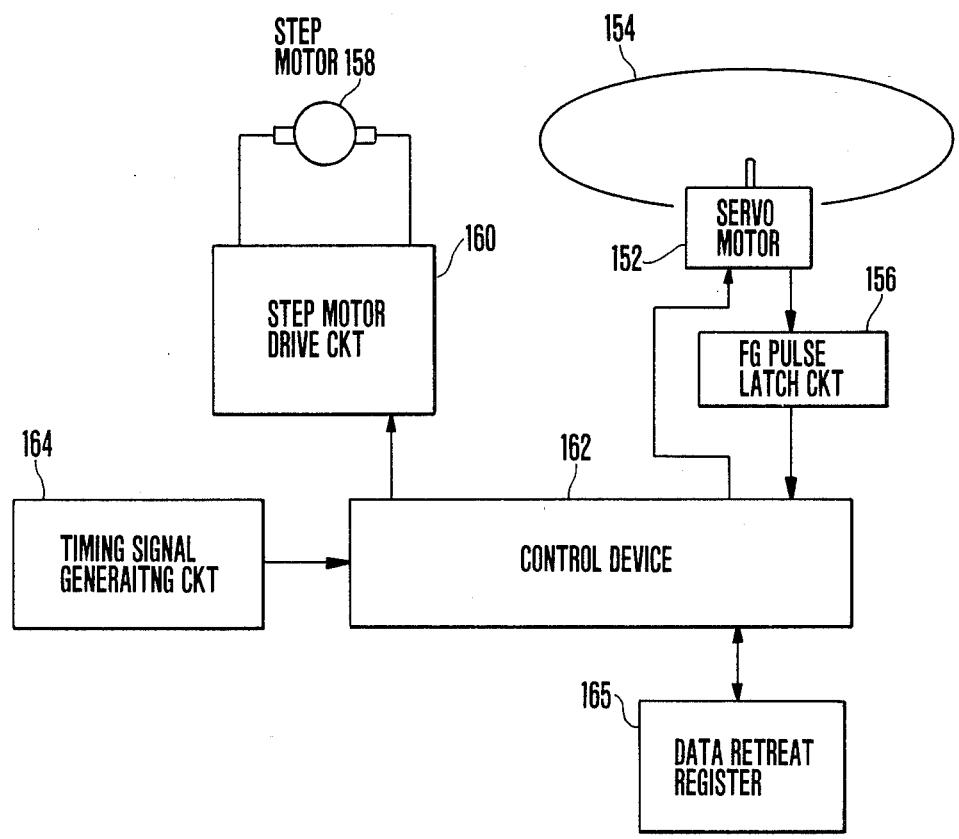

DRIVE DEVICE

BACKGROUND OF THE INVENTION

1. Field of the Invention

This invention relates to drive devices having co-ordination control of, for example, a servo motor and other instruments.

2. Description of the Related Art

This kind of drive device has been known as applied to apparatus, for example, of the type in which the servo motor is used for rotating a magnetic disc, and the other instrument is a data write-in/read-out device having a pulse motor for driving the head. As such a device, mention may be made of:

(i) The servo motor and the step motor were controlled by respective individual control systems.

(ii) In case when a microcomputer was used to control both servo and step motors, for the clock was made common with the internal one of the microcomputer, a novelty or limitation on software was prerequisite.

(iii) If, as shown in FIG. 7, a single control system 162 was used for controlling both a servo motor 152 and a step motor 158, a timing signal generating circuit 164 for driving the step motor 158 was provided separately and, for control of the step motor 158, the processing of control of the servo motor 152 was interrupted with its intermediate state stored in a data retreat register 165. After the termination of the control of the step motor 158, the data retreat register 165 was then read out to proceed with the processing of the servo motor 152.

In the conventional techniques as shown in the above-described paragraphs (i)–(iii), however, there have been drawbacks of resulting in a complicated computation algorism and, because of the necessity of using the data retreat register, involving a large increase in the complexity and size of the device.

SUMMARY OF THE INVENTION

With the foregoing in mind, a first object of the invention is to provide a drive device capable of controlling a plurality of devices without causing an increase of the size of the device and further without requiring a complicated sequence of operations.

A second object is to provide a drive device of simple structure but capable of controlling each device of an apparatus for recording video signals on a medium.

Still another object is to provide apparatus of simple structure for driving a drive device for a medium used in a recording apparatus for recording video signals on the medium and a processing circuit for processing the video signals.

Under such objects, according to a preferred embodiment of the invention, in the recording apparatus having a recording head for recording video signals on a magnetic disc as the disc rotates, there is disclosed a recording apparatus having a servo motor, means for generating a feedback signal representing the rotating state of the servo motor, head moving means for changing the recording position of the recording head relative to the magnetic disc, and control means for performing a first sequence of controlling the rotating state of the servo motor in response to the feedback signal and a second sequence of controlling the moving state of the head moving means time-dividedly in response to generation of the feedback signal, so that the apparatus is constructed without the necessity of using a standard timing generating source solely used for controlling the movement of the head.

Other objects and features of the invention will become apparent from the following description of embodiments.

BRIEF DESCRIPTION OF THE DRAWINGS

FIG. 2 is a timing chart illustrating the relationship of control timing of the control device 12 shown in FIG. 1 and FG pulses.

FIG. 3 is a flowchart illustrating a control method of the control device 12 shown in FIG. 1.

FIG. 4 is a timing chart illustrating another example of FIG. 2.

FIG. 7 is a block diagram illustrating the structure of the conventional device.

DETAILED DESCRIPTION OF THE PREFERRED EMBODIMENTS

The present invention is next described in detail on the basis of embodiments thereof.

Figure 1:
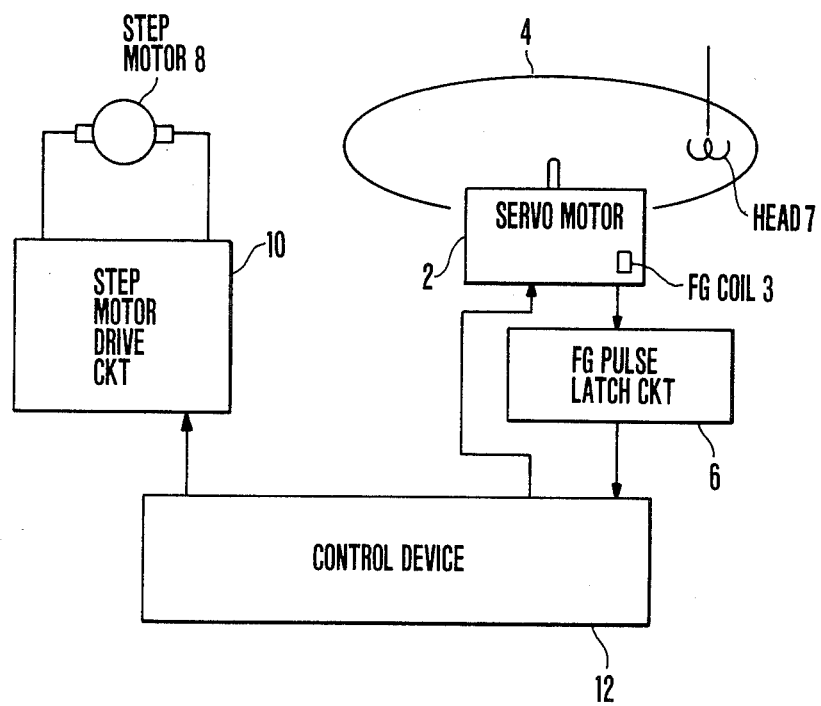
FIG. 1 is a block diagram of a first embodiment of a device according to the present invention.

FIG. 1 is a view of entire construction illustrating an embodiment of a magnetic disc control device to which the invention is applied. In this figure, 2 is a servo motor; 3 is an FG coil for detecting the rotating state of the servo motor 2; 4 is a magnetic disc.

A latch circuit 6 detects and holds a pulse signal being sent in accompaniment with rotation of the servo motor 2. (The signal is hereinafter called "FG pulses": a plurality of pulses are sent in every one revolution of the motor 2).

A step motor 8 drives a head 7 for recording signals on the magnetic disc 4.

10 is a drive circuit for the step motor 8.

A control device 12 controls the servo motor 2 and the step motor 8 according to a control procedure to be described in detail later.

FIG. 2 is a timing diagram illustrating an example of the operation of the embodiment shown in FIG. 1. As shown in this figure, in synchronism with detection of the FG pulses, the speed of the servo motor 2 is first controlled. Then, a pulse is sent to rotate the step motor 8 by one step. That is, in synchronism with the FG pulses, the drive control of the servo motor 2 is made, and then the drive control of the step motor 8 is made.

FIG. 3 is a flowchart illustrating a general control sequence of the embodiment shown in FIG. 1.

At first, in a step S1, the count value of a counter (not shown) incorporated in the control device 12 is initially set to "N". This means that when the sending interval of the FG pulses is T (second), the step period of the step motor 8 is set to NT (second). Along with that, a drive-start signal is given to the servo motor 2 so as to rotate the servo motor 2.

In a step S2, whether or not the disc 4 is already rotating is tested. As a result, if the disc 4 is not rotating, a prescribed error processing is performed in a step S9. The content of this error processing is to release the drive-start signal given to the servo motor 2 and stop the power supply to the servo motor 2. Since the details of such processing content have no direct relation with the present invention, no more explanation is made.

If the disc 4 is rotating (step S2:Yes), the detection of the FG pulse is waited for in a step S3, while counting the FG pulse interval. And, in accompaniment with the detection of the FG pulse, the speed control voltage to be applied to the servo motor 2 is determined in a step S4, depending on the interval of the FG pulses detected in the step S3.

Then, the content of the aforesaid counter is subtracted by 1 in a step S5.

The above-described steps S2-S5 are executed repeatedly until the value of the counter becomes 0 (Step S6).

In a step S7, each time the N-th FG pulse is detected, the step motor 8 is rotated one step.

In a step S8, whether or not the head 7 has reached on the aimed track is tested. If not so, the above-described steps S1-S7 are executed repeatedly.

Therefore, the example of the operation shown in FIG. 2 corresponds to that manner of control which takes place when N=1 in the step S1. Yet, when the total sum of the time necessary to the speed control of the servo motor 2 and the time necessary to drive the step motor 8 exceeds the sending period of the FG pulses, N=2 or more must be set. Or otherwise, it would become impossible to drive the step motor in synchronism with the FG pulse.

Though the foregoing embodiment has been described in connection with the pulse motor to be driven along with the servo motor, the present invention is not confined to such a pulse motor, and it is also possible to control the driving of ther instruments.

That is, instead of performing the drive control of the aforesaid pulse motor, it is also possible to perform RF level detection timing control for performing auto-tracking detection (ATF), or sample timing control for performing auto-white balance.

FIG. 4 is a timing chart illustrating an example of such control manner. Each time the FG pulse is detected, the speed control of the servo motor, the drive control of the step motor and the sample timing control for performing the auto-white balance are performed in sequence.

Figure 5:
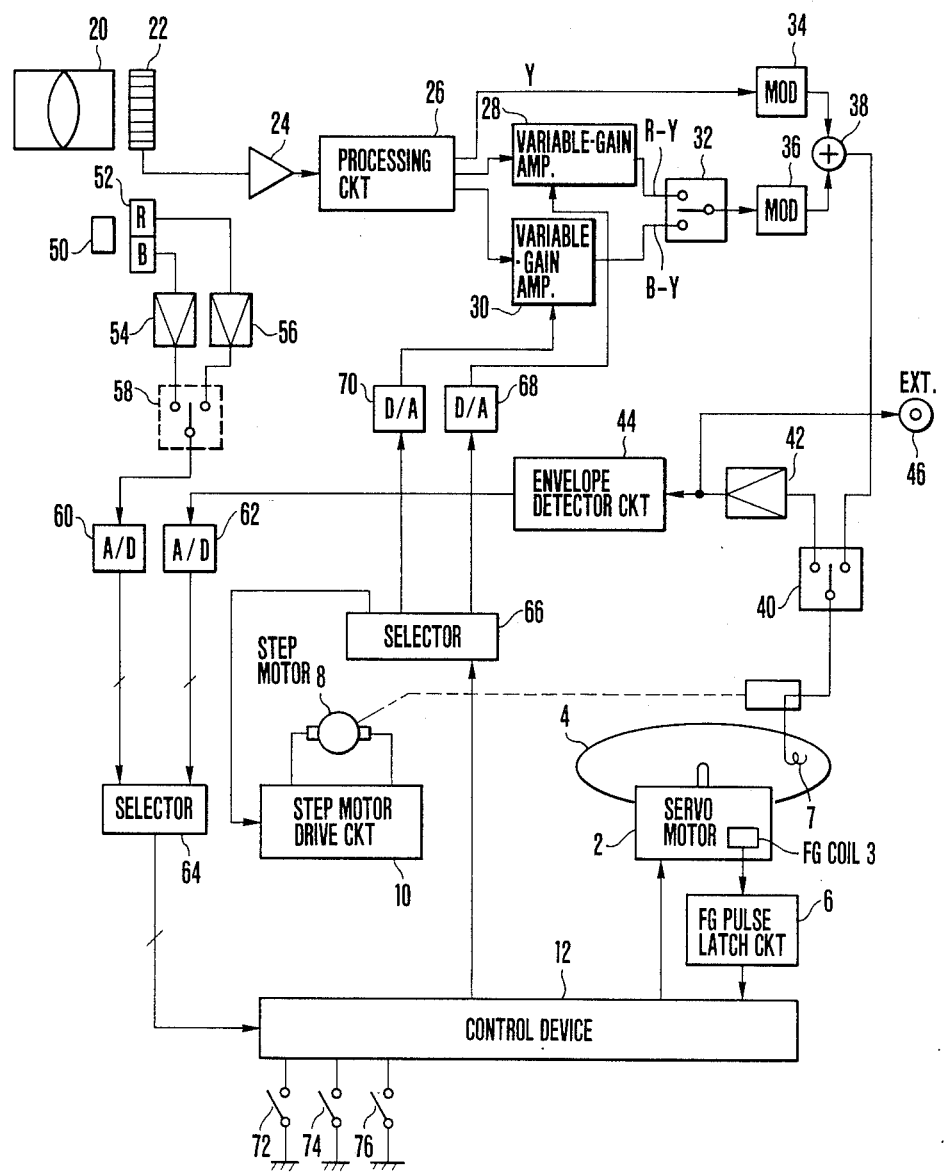
FIG. 5 is a block diagram of a second embodiment of the device according to the invention.

Next, a second embodiment in which in addition to such a drive control of the servo motor 2 as described above, a sample timing control for performing the auto-tracking detection and auto-white balance is described by using FIG. 5.

FIG. 5 is a block diagram illustrating the construction of the second embodiment of the invention.

In FIG. 5, light from a photographic lens 20 is focused on a solid state image pickup element 22 such as CCD. The video signals from the element 22 are applied through an amplifier 24 to a processing circuit 26 which produces a luminance signal Y and color-difference signals R−Y and B−Y.

The color-difference signals R−Y and B−Y are amplified by respective variable-gain amplifiers 28 and 30 whose gains depend on the inputs of indicated values. A switch circuit 32 changes over between the signals from the variable-gain amplifiers 28 and 30 in every one horizontal scanning period. The luminance signal Y and either one of the color-difference signals are modulated by respective modulation circuits 34 and 36. An adder circuit 38 adds the outputs of the modulation circuits 34 and 36. A switch circuit 40 responsive to changing over between a reproduction mode and a recording mode connects the head 7 to either the adder circuit 38 or reproducing amplifier 42. An envelope detector circuit 44 detects the envelope of the output of the reproducing amplifier 42. 46 is an external output terminal for producing the reproduction output of the reproducing amplifier 42. A white diffusion plate 50 is positioned in front of a sensor 52 for color temperature detection. This sensor 52 has a first sensor element responsive to red light (a light bundle of first wavelength) and a second sensor element responsive to blue light (a light bundle of second wavelength). To each sensor element is connected an amplifier 54 or 56 respectively. The outputs of the amplifiers 54 and 56 are time-dividedly taken in an A/D converter 60 by a switch circuit 58. A selector 64 selects one of the outputs of the A/D converter 60 and an A/D converter 62 to be taken into the control device 12. Another selector 66 receives control data from the control device 12 and applies its output selectively to D/A converters 68 and 70 and a step motor drive circuit 10. For note, when the selector 66 selects the D/A converter 68 or 70, the control device 12 computes data to be used for controlling the variable-gain amplifiers 28 and 30 on the basis of the data the A/D converter 60 produces.

72 is an operation end switch for indicating the end of the operation of the device. 74 is a change-over switch for changing over between the reproducing mode and the recording mode. 76 is a switch for producing an indication of moving the head 7 by the step motor 78.

Figure 6:
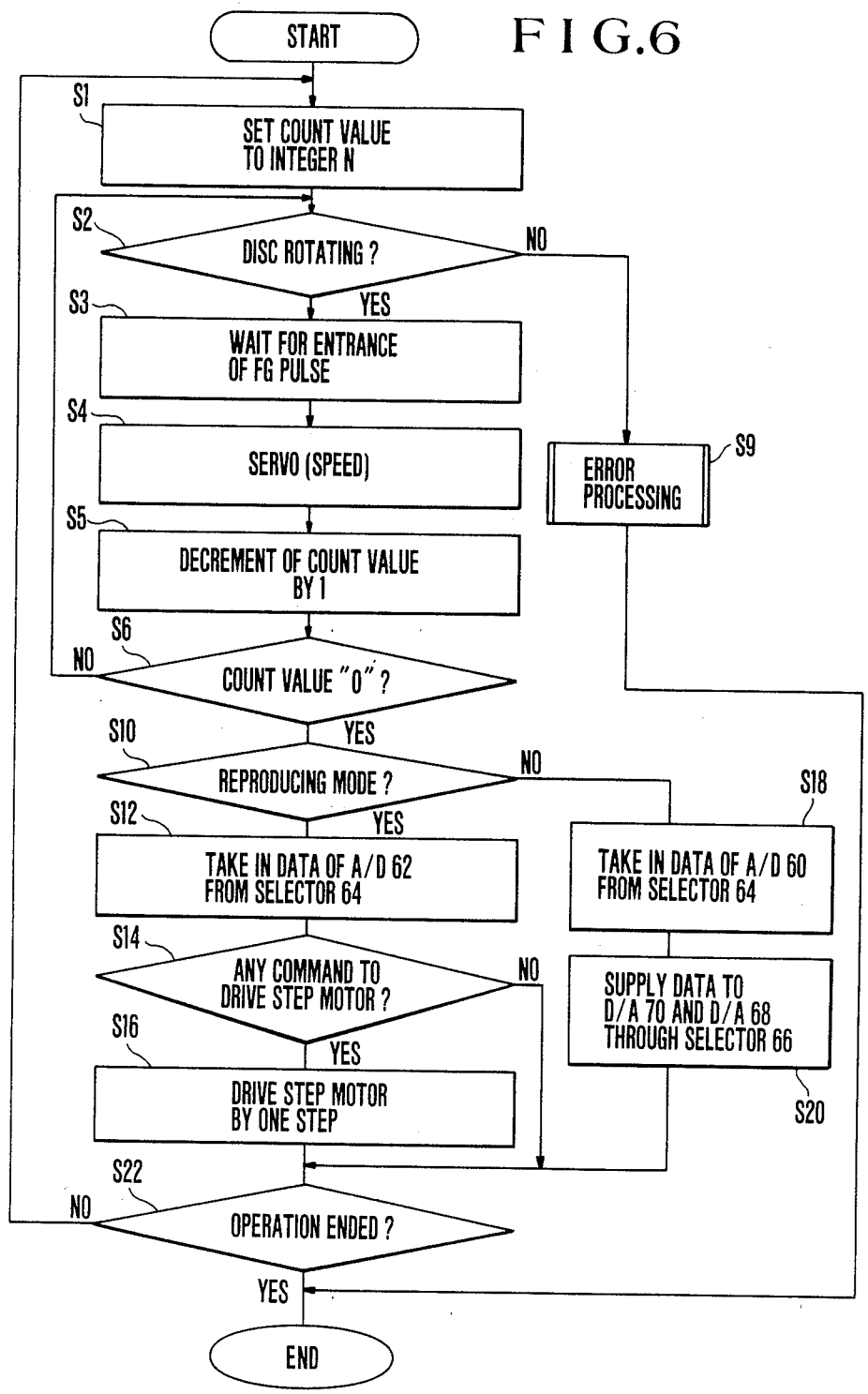
FIG. 6 is a flowchart illustrating a control method of the control device 12 shown in FIG. 5.

The operation of the embodiment constructed in such a way as has been described above is described by using the flowchart of FIG. 6. In FIG. 6, the similar steps to those of FIG. 3 are denoted by the same reference characters, and their explanation is omitted.

In FIG. 6, S10 is a step of testing whether the reproducing mode or the recording mode is set by the aforesaid switch 74. In case the reproducing mode is set, the switch circuit 40 is changed over to the reproducing amplifier 42, and the data of the A/D converter 62 is taken into control device 12 from the selector 64 (step S12). The control device 12 detects whether or not the data obtained from the selector 64 is proper, in other words, the envelope of the reproduction output of the head 7 is above a prescribed value. If it is below the prescribed value, as the drive command is being applied to the step motor 8, advance from a step S14 to S16 to drive the step motor 8 one step. For note, what is called the "step motor drive command" in the step S14 includes, besides the auto-tracking detection (ATF) which operates with automatic control in such a manner that the reproduction output of the head 7 becomes higher than the prescribed level as has been described before, also an instruction for the regular advancement of the position of the head 7 relative to the disc 4 by the switch 76.

Next, the operation of the case of not the reproducing mode but the recording mode being set by the switch 74 in the step S10 is explained. In case when such a recording mode is being set, the data of the A/D converter 60 are taken into control device 12 from the selector 64 (step S18). For this time, the changing over of the switch circuit 58 is also performed by the control device 12, and the two signals from the sensor 52 for color-temperature detection time-dividedly enter the control device 12 through the selector 64. The control device 12 computes the gains of the variable-gain amplifiers 28 and 30 on the basis of the data from the selector 64, and outputs their data to the D/A converters 68 and 70 through the selector 66 (a step S20). Therefore, the gains of the variable-gain amplifiers 28 and 30 are properly controlled on the basis of the output of the sensor 52 for color-temperature detection. As has been described above, after the steps S16 and S20 have been executed, when the end of operation is indicated by the operation end switch 72, the flow ends from a step S22, or when the end of operation is not indicated, the flow returns to the step S1, and the above-described operation is repeated.

For note, in this embodiment, depending on either the reproducing mode or the recording mode, the sample timing for performing the white balance control and the detection timing for performing the auto-tracking detection (ATF) is made selectively controlled. But, if the arrangement is altered by omitting the step S10 and by executing the step S22 after the steps S18 and S20 have been executed to follow the step S16, the control of the timing shown in FIG. 4 can be performed.

In the foregoing embodiment, the servo motor 2 is rotated with 60 Hz in response to the television signal of NTSC system, and the video signal for one field is recorded in one of concentric tracks formed on the disc 4.

Meanwhile, most of the frequencies of the generally used commercial power sources are 60 Hz or 50 Hz. Therefore, when photography is made with the use of the device of this embodiment under indoor illumination, ripple components of 120 Hz or 100 Hz will be superimposed on the output of the sensor 52 for color-temperature detection.

To cancel such ripple components, a signal may be taken out from the sensor 52 for color-temperature detection in each period equal to an integer times the corresponding period to the frequency of 120 Hz or 100 Hz. So it is sufficiently advantageous that the servo motor 2 is rotated with 60 Hz and the output of the sensor 52 for color-temperature detection is taken in response to the FG pulse produced in response to its rotation as in the embodiment of the invention. Also, if N to be set in the step S1 of the flowchart of FIG. 6 is 5, the sample timing for performing the white balance control can be made in a period of integer times the corresponding period of the frequency of 120 Hz or 100 Hz, and the above-described ripple components can be removed.

As has been described above, according to the embodiments of the invention, the feedback signal produced depending on the rotating state of the servo motor is made used as the standard and an instrument of any kind is arranged to be triggered by that feedback signal. Therefore, not only the advantage that the timing signal generating circuit which has been used in the prior art becomes unnecessary to provide as a separate means, but also it is advantageous in that, despite a single control device is used, the preserving and returning operation of the internal state becomes unnecessary.

What is claimed is:

1. An apparatus comprising:
   (a) rotation drive means for rotation of a recording medium;
   (b) generating means for generating a signal representing the rotating state of said rotation drive means a plurality of times for one revolution;
   (c) recording head means for recording information on said recording medium;
   (d) recording head moving means for changing the position of said recording head means relative to said recording medium; and
   (e) control means for time-serially controlling said recording head moving means and said rotation drive means in in response to said signal generated by said generating means.

2. An apparatus according to claim 1, wherein said rotation drive means includes a servo motor and wherein said control means detects the interval of such signals generated by said generating means to control said servo motor so as to rotate said servo motor at a constant speed.

3. An apparatus according to claim 1, wherein said recording head moving means includes a step motor driven by said control means.

4. An apparatus according to claim 1, wherein said control means is responsive to said signal generated by said generating means to successively control said rotation drive means and said recording head moving means.

5. An image pick-up apparatus comprising:
   (a) rotation drive means for rotation of a member;
   (b) generating means for generating a signal representing the rotating state of said rotation drive means;
   (c) detecting means for detecting color temperature information of said image; and
   (d) control means responsive to each said signal generated by said generating means for time-serially controlling both said rotation drive means and said detecting means.

6. An apparatus according to claim 5, wherein said member is a recording medium.

7. An apparatus according to claim 5, further comprising:
   converting means for converting an image to an electrical signal and
   processing means for processing the electrical signal converted by said converting means in response to the color temperature detected by said detecting means.

8. An apparatus according to claim 7, wherein said control means controls both said rotation drive means and the timing of output of the color temperature information from said detecting means to said processing means in response to said signal generated by said generating means.

9. An apparatus according to claim 5, wherein said generating means includes means for generating a prescribed number of pulse signals during one revolution of said rotation drive means.

10. An apparatus according to claim 9, wherein said control means operates said rotation drive means in response to the interval of said pulse signals.

11. An apparatus according to claim 5, wherein said detecting means includes:
    (a) a first sensor responsive to a light bundle of a first wavelength;
    (b) a second sensor responsive to a light bundle of a second wavelength; and
    (c) diffusing means provided in front of said first and second sensors.

12. A reproducing apparatus comprising:
    (a) rotation drive means for rotation of a member;
    (b) generating means for generating a signal representing the rotating state of said rotation drive means;
    (c) reproducing means for reproducing a signal recorded on a recording medium;
    (d) displacing means for changing the position of said reproducing means relative to said medium; and (e) control means for time-serially controlling both said rotation drive means and said displacing means in response to said signal generated by said generating means.

13. An apparatus according to claim 12, wherein said member is said recording medium.

14. An apparatus according to claim 12, further comprising:
   detecting means for detecting the level of the signal reproduced by said reproducing means, and wherein said control means controls said displacing means in such a manner that the level of said detected signal becomes a prescribed value.

15. An apparatus according to claim 12, wherein said generating means includes means for generating a prescribed number of pulse signals during one revolution of said rotation drive means.

16. An apparatus according to claim 15, wherein said control means operates said rotation drive means in response to the interval of said pulse signals.

* * * * *